F. H. WINTER.
REGULATOR FOR ELECTRIC GENERATORS.
APPLICATION FILED SEPT. 11, 1918.

1,373,928.

Patented Apr. 5, 1921.

Inventor:
Fred H. Winter,
by Albert G. Davis
His Attorney

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

REGULATOR FOR ELECTRIC GENERATORS.

1,373,928.   Specification of Letters Patent.   Patented Apr. 5, 1921.

Application filed September 11, 1918. Serial No. 253,604.

*To all whom it may concern:*

Be it known that I, FRED H. WINTER, a citizen of the United States, residing at Schenectady, in the county of Schenectady, State of New York, have invented certain new and useful Improvements in Regulators for Electric Generators, of which the following is a specification.

My invention relates to automatic regulators for electric generators and has for its object to provide a new and improved automatic regulator of the vibratory type.

In order to maintain uniform or to increase the voltage of an electric generator as the load thereon increases, it is necessary to increase the voltage generated in the armature of the generator as the load increases. If, as ordinarily is the case, the speed of the generator is maintained approximately uniform, it is necessary in order to increase the generated voltage to increase the field flux. As the field flux of an electric generator, as usually designed, is increased, it becomes necessary to produce an increasing variation in the field excitation for a given increment of field flux because of the decreasing ratio between field flux and field excitation as the condition of saturation is approached.

It is generally desirable to provide a vibratory regulator with anti-hunting means, which, however, have a tendency to modify the action thereof in such a manner that the excitation of the generator, with which such a regulator is used, is not varied in the proper manner to maintain a uniform or increasing voltage with increasing load. In other words, the use of anti-hunting means in a regulator tends to effect under-compounding of the generator to which the regulator is applied.

The object of my invention is to provide a new and improved regulator of the vibratory type, comprising anti-hunting means, in which the under-compounding tendency of the anti-hunting means may be compensated to the desired degree.

My invention may best be understood by reference to the following specification considered in connection with the accompanying drawings, while the scope of my invention is defined in the appended claims.

Figure 1:
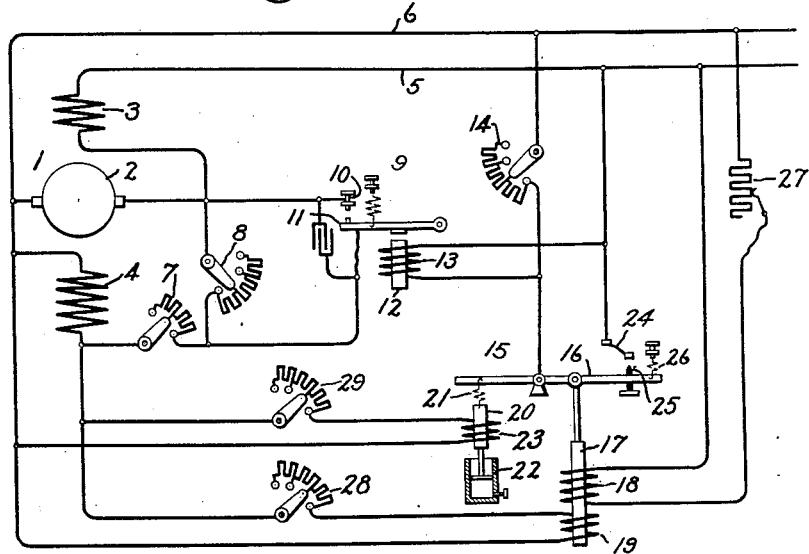
Figure 2:
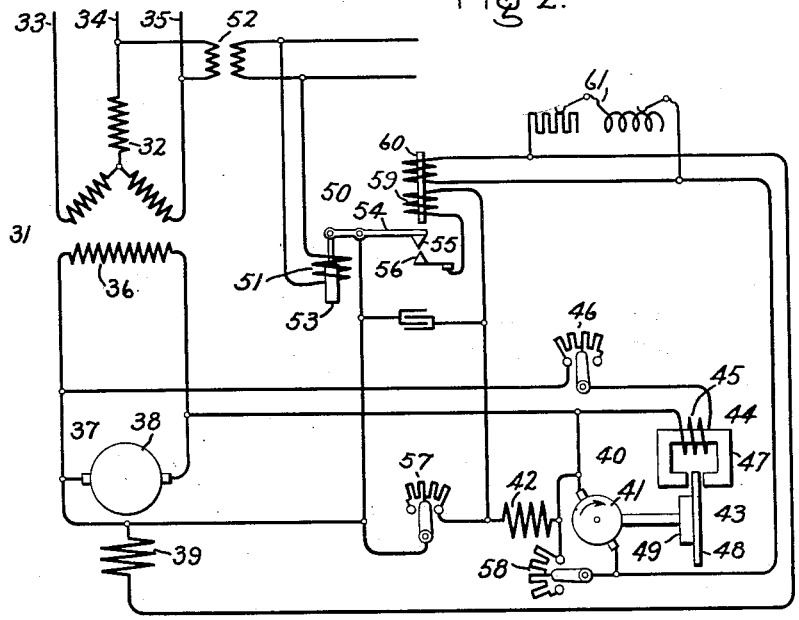

Referring to the drawings in which Figure 1 shows one modification of my invention applied to the regulation of a direct current generator, and in which Fig. 2 shows a second modification of my invention embodied in a system of regulation for alternating current generators in which a counter electromotive force machine is employed, and referring first particularly to Fig. 1, 1 denotes a direct current generator having an armature 2, a series field winding 3 and a shunt field winding 4. One side of the armature is connected, through the series field winding 3, to a supply main 5, and the other side of the armature is connected to a supply main 6. The shunt field winding 4 is connected, in series with adjustable resistances 7 and 2, across the armature 2. 9 denotes a relay comprising coöperating stationary and movable contacts 10 and 11, connected to control the effectiveness of rheostat 8, and an electromagnet 12, provided with a winding 13, for actuating the movable contact 11. The winding 13 is preferably connected through an adjustable resistance 14 across the supply mains 5, 6. 15 denotes a regulator comprising a vibratory member 16, a core 17 connected to said member, windings 18 and 19 coöperating with the core 17 for actuating the same, a core 20 connected to the member 16 by means of the resilient connection 21, a dash-pot 22 for controlling the movement of the core 20, a winding 23 for operating the core 20, a stationary contact 24, a movable contact 25, carried by the member 16 and adapted to coöperate with the stationary contact 24, and an adjustable spring 26 for modifying the operation of the member 16. The winding 18 is connected in series with an adjustable resistance 27, to the mains 5—6. The windings 19 and 23 are connected, in series with adjustable resistances 28 and 29 respectively, in multiple to the shunt field winding 4 of the generator 1. By means of the adjustable resistances 28 and 29, the time constants of the multiple circuits in which the windings 19 and 23 are located may be adjusted. Stationary contact 24 is connected to one terminal of the winding 13 of the electromagnet 12, and the movable contact 25 is electrically connected, through the vibratory member 16, to the other terminal of the winding 13 of the electromagnet 12.

The operation of the system shown in Fig. 1, as at present understood, is as follows:

Assume the generator 1 to be in operation and to be impressing voltage on supply mains 5—6. Furthermore, assume the resistance 28, in series with the winding 19, to be adjusted so that the time constant of the multiple circuit, including the winding 19, will be less than the time constant of the shunt field winding 4 of the generator 1, in order that the current in the winding 18 will be approximately in time phase with the voltage impressed upon the shunt field winding 4. Assume also that the adjustable resistance 29 is adjusted so that the time constant of the multiple circuit, including winding 23, will correspond approximately to the time constant of the field winding 4, in order that the current in the winding 23 will be substantially in time phase with the current in the field winding 4. Therefore, the winding 23 will be energized in accordance with the current in the field winding 4. The adjustable resistance 8 will have been adjusted so that, if continuously ineffective, the voltage of the generator 1 would be greater than that desired and, if continuously effective, the voltage of the generator 1 would be less than that desired. First suppose that the voltage across the mains 5—6 has the desired value and consider the instant when the vibratory member 16 of the regulator 15 is in the position shown, at which time the relay 9 will have opened the shunt circuit around the resistance 8, and hence the voltage impressed upon the shunt field winding 4 will be a minimum. The winding 19 of the regulator 15 will at this instant have a minimum energization and hence the spring 26 will cause the member 16 to move so that the contacts 24 and 25 will be engaged. Upon the engagement of the contacts 24 and 25 the winding 13 of the relay 9 is short-circuited so that the contacts 10 and 11 thereof will close the shunt circuit to the resistance 8, and the voltage impressed upon the shunt field winding 4 will thereupon increase to a maximum. Upon the increase in the voltage across the shunt field 4 the energization of the winding 19 of the regulator 15 will increase, whereupon the member 16 will be moved to disengage the contacts 24 and 25. Upon the disengagement of contacts 24 and 25 the winding 13 of the relay 9 will again become energized, thereby disengaging the contacts 10 and 11 so that the resistance 8 again becomes effective and the voltage upon the shunt field winding 4 is reduced to a minimum. This cycle of operations is rapidly repeated, and the member 16 is rapidly vibrated by the anti-hunting winding 19. If the voltage across the mains 5—6 varies, the energization of the regulator winding 18 will be varied so that the mean position of the vibrating member 16 will be varied, and thereby the mean value of the current in the field winding 4 will be varied, so that the voltage generated in the armature 2 will be modified in the manner necessary to maintain substantially uniform voltage across the mains 5—6. As previously noted, when the load upon the generator 1 increases, it is necessary to increase the excitation thereof in order to maintain a uniform voltage across the mains 5—6, and it becomes necessary that the excitation increase more rapidly than the desired generated voltage. The anti-hunting winding 19, which is responsive to the voltage applied to the field winding 4, tends to prevent this, since an increase in the mean voltage applied to the shunt field winding 4 results in an increase in the mean effect of the anti-winding 19, thereby tending to under-compound the generator. This under-compounding tendency of the winding 19 is compensated to the desired degree through the operation of the core 20, resilient connection 21 and winding 23, because, upon an increase in the current in the field winding 4, winding 23 tends to draw down the end of the member 16 to which the core 20 is connected, thereby opposing the action of the anti-hunting winding 19. The spring 21, however, permits free vibration of the member 16, while the dash-pot 22 dampens the movement of the core 20. By means of the adjustable resistances 28 and 29, the relative effect of the anti-hunting winding 19 and the compensating winding 23 may be adjusted so that the regulator will maintain the voltage across the mains 5—6 substantially constant, or so that it will increase or decrease by the desired amount, as the load upon the generator 1 increases.

Referring to Fig. 2, 31 denotes an alternating current generator having an armature winding 32 connected to the supply mains 33, 34 and 35 and a field winding 36, to which is connected an exciter 37, comprising an armature 38 and a shunt field winding 39. 40 denotes a counter electromotive force machine, or motor, having an armature 41, connected in series with the shunt field winding 39 of the exciter 37, and a field winding 42. 43 represents a brake of the magnetic drag type comprising a field member 44 provided with an energizing winding 45, connected in series with an adjustable resistance 46 across the armature 38 of the exciter 37, and a core 47, between the poles of which is located an armature 48, consisting of a disk of conducting material connected to rotate with the armature 41 of the electromotive force machine 40. If found desirable, a fly-wheel 49 may also be connected to rotate with the armature 41, the function of the fly-wheel being to prevent sudden changes while permitting gradual changes in the speed of the motor. Obviously, if the armature 41 and the armature 48 have either individually or together sufficient fly-wheel effect, the fly-wheel 49 may be dispensed with. 50 denotes a vibratory regulator having a winding 51 connected, by means of a potential transformer 52, to the supply mains 34 and 35, a movable core 53 actuated by said winding, a movable arm 54 pivotally connected to the core, a movable contact 55 carried by said arm, and a stationary contact 56 coöperating with the movable contact 55. The field winding 42 of the counter electro-motive force machine 40 is connected in series with the adjustable resistance 57 across the armature 38 of the exciter 37. An adjustable resistance 58 may if desired be connected in shunt to the armature 41 of the counter electromotive force machine 40 in order to vary the portion of the field current of the exciter which traverses the armature 41. One terminal of the resistance 57 is electrically connected to the movable contact 55 of the regulator 50 through the movable arm 54, and the other terminal of the resistance 57 is connected in series with an anti-hunting or speed winding 59, coöperating with the movable arm 54 of the regulator 50, to the stationary contact 56. The brushes of the motor 40 are shown displaced in a direction opposite to the direction of the rotation of the armature 41, which is indicated by an arrow. By means of the armature reaction and the location of the brushes, a magnetomotive force opposing the magnetomotive force of the field winding 42 is developed. The value of the component of the armature reaction which opposes the magnetomotive force of the field winding 42 may be increased to the desired degree by increasing the displacement of the brushes. The effect of the magnetomotive force opposing the magnetomotive force of the field winding 42 upon the operation of this system will be hereinafter explained. The exciter field winding 39 is connected, in series with a winding 60, associated with the vibratory device 50 and with the armature 41 of the counter electromotive force machine 40, across the armature of the exciter 37. In shunt to the winding 60 is connected an adjustable impedance 61 for regulating the action thereof. The windings 59 and 60 are preferably mounted upon a core and coöperate with the movable arm 54. The winding 59 functions as an anti-hunting winding and assists in the vibration of the contact 55, while the winding 60 operates to compensate to the desired degree for the tendency of the anti-hunting winding 59 to under-compound the generator 31, as will be more fully described hereinafter.

The operation of the system shown in Fig. 2, as at present understood, is as follows:

Assume the alternating current generator 31 to be in operation and the exciter 37. to be supplying current to the field winding 36 thereof in an amount sufficient to maintain the voltage across the mains 34 and 35, which are connected to the armature winding 32, substantially constant. The movable member 55 of the vibratory device 50 will then be vibrating rapidly, and when the contacts 55 and 56 are in engagement, the resistance 57 in series with the field winding 42 of the counter electromotive force machine 40 is short-circuited, whereas, when the contacts 55 and 56 are out of engagement, the short circuit around the resistance 57 will be open. When the resistance 57 is short-circuited, the field winding 42 of the motor 40 is more strongly-energized, and hence the machine 40 develops a greater counter electromotive force, than when the short circuit around the resistance 57 is open. Furthermore, the energization of the field winding 39 of the exciter 37, and consequently the voltage of the exciter 37, is less when the counter electromotive force of the machine 40, with the armature of which the excited field winding 39 is connected in series, is higher than when the counter electromotive force of the machine 40 is low. Consequently, the variation in the counter electromotive force of the machine 40. caused by the rapid engagement and disengagement of the contacts 55 and 56, controls the voltage of the exciter 37 and likewise the voltage developed in the armature winding 32 of the generator 31. If the voltage across the mains 34 and 35 has the predetermined value for which the system is adjusted, the portion of the period of each vibration during which the contact 55 engages the contact 56 will bear such a relation to the portion of the period during which the contact 55 is out of engagement with the contact 56 that the mean value of the voltage applied to the field winding 36 of the alternating current generator 31 will be just sufficient to maintain said predetermined voltage across the mains 34 and 35. If now the voltage across the mains 34 and 35 decrease, the portion of the period of each vibration during which the contact 55 will be out of engagement with the contact 56 will be increased with the result that the counter electromotive force of the motor 40 will decrease, the voltage of the exciter 37 will increase, and consequently the voltage across the mains 34 and 35 will be increased. Similarly, if the voltage across the mains 34 and 35 increases above the said predetermined value, the portion of the period of each vibration during which the contacts 55 and 56 are in engagement will be increased with the result that the counter electromotive force of the motor 40 will be increased, the voltage of the exciter 37 will be decreased, and consequently the voltage across the mains 34 and 35 will be decreased. The vibratory regulator 50 is provided with an anti-hunting device comprising a winding 59 which is energized upon the engagement of the contacts 55 and 56 and when energized tends to attract the movable arm 54 and thereby to move the contact 55 out of engagement with the contact 56. The use of this anti-hunting device prevents hunting, which would result if it were not used, due to the time lag of the system. This anti-hunting device however, tends to cause the generator to undercompound as the load increases. This is due to the fact that the anti-hunting winding 59 is energized only when the contacts 55 and 56 are in engagement. Since it is necessary that the period of disengagement of the contacts 55 and 56 increase with an increase in load in order to increase the field current of the generator to prevent undercompounding, it is evident, that this increase in the period of disengagement of the contacts 55 and 56 decreases the average effect of the winding 59. Since this decrease in the average effect of the winding 59 decreases the force opposing the action of the winding 51, a lower voltage across the terminals of the winding 51 will move the contact 55 into engagement with contact 56. Therefore it will be seen that the tendency of the anti-hunting winding 59 will be to cause the generator to undercompound. To compensate for this undercompounding tendency of the anti-hunting winding 59 an auxiliary winding 60 is employed. This winding is energized in accordance with the current in the field winding 39 of the exciter and tends, through its influence upon the movable arm 54, to disengage the contacts 55 and 56. Consequently, when a heavy load current traverses the field winding 39, the winding 60 will cause the contacts 55 and 56 to remain open a greater portion of the time, thereby decreasing the counter electromotive force of the machine 40 and increasing the current traversing the exciter field winding 39 and, consequently, the voltages developed in the induced winding 32 of the generator 31. The operation of the winding 60 may be modified by adjusting the impedance 61 so that the regulator may cause the voltage of the generator 31 to decrease, remain uniform, or to increase as the load thereon increases. The component of the magnetomotive force developed by the armature current of the counter electromotive force machine 40, which opposes the magnetomotive force of the field winding 42, lowers the minimum value of the field flux and in some cases may even reverse the flux for brief periods. If the flux be reversed, the armature, through its continued rotation caused by the fly wheel effect of the rotating parts, will develop a boosting electromotive force. Since the armature current increases as the field flux decreases, the demagnetizing effects of the magnetomotive force thereof is greatest when the energization of the field winding 42 is least. Since the energizing winding 45 of the brake 43 is connected across the exciter armature 38, the braking torque exerted by the brake 43 will be greatest when the voltage across the armature 38 is greatest. Since the voltage across the armature 38 is greatest when the current in the field winding 39 and, consequently, in the motor armature 41, is greatest, it follows that the braking torque exerted by the brake 43 is greatest when the current traversing armature 41 of the motor 40 is greatest and that the braking torque of the brake 43 will vary as a function of the current in the armature 41. The braking torque exerted by the brake 43 will also vary as a function of the speed of the motor 40. Sudden changes in the speed of the motor due to variations in its field or armature current are prevented by the inertia or fly wheel effect of the rotating parts while gradual changes in the speed are limited and controlled by the brake 10, which opposes the rotation of the motor over its entire speed range with a torque varying as a function of the motor speed. Racing of the motor upon variations of its excitation is thus prevented in a simple and efficient manner and the regulating operation thereof is rendered safe and reliable over its entire speed range.

The expression "means to compensate the under-compounding tendency of the anti-hunting means" used in this specification, is intended to include means for partially, fully or over-compensating the under-compounding tendency of the anti-hunting means.

While I have herein shown and described two regulating systems embodying my invention, I do not desire to be limited to the exact arrangements shown and described but seek to cover in the appended claims all those systems and modifications which come within the true spirit and scope of my invention.

What I claim as new and desire to secure by Letters Patent of the United States, is:—

1. The combination with a dynamo-electric machine having a power circuit and an exciting circuit, of a regulator therefor comprising a winding responsive to an electrical condition of said power circuit, anti-hunting means, a vibratory contact actuated by said winding and said anti-hunting means, and means responsive to an electrical condition of said exciting circuit for modifying the action of said contact to compensate the under-compounding tendency of said anti-hunting means.

2. The combination with a dynamo-electric machine having a power circuit and an exciting circuit, of a regulator therefor comprising a winding responsive to an electrical condition of said power circuit, an anti-hunting winding responsive to an electrical condition of said exciting circuit, a vibratory contact actuated by said windings, and means responsive to an electrical condition of said exciting circuit for modifying the action of said contact to compensate the under-compounding tendency of said anti-hunting means.

3. The combination with a dynamo-electric machine having a power circuit and an exciting circuit of a regulator therefor comprising a winding responsive to an electrical condition of said power circuit, an anti-hunting winding responsive to an electrical condition of said exciting circuit, a vibratory contact actuated by said windings, and means responsive to an electrical condition of said exciting circuit for modifying the action of said contact to compensate the under-compounding tendency of said anti-hunting means, said compensating means being adjustable to regulate the degree of compensation effected thereby.

4. The combination with a direct current dynamo-electric machine having a power circuit and an exciting circuit of a regulator for varying the current in said exciting circuit comprising a winding responsive to an electrical condition of said power circuit, an anti-hunting winding responsive to an electrical condition of said exciting circuit, a vibratory contact actuated by said windings, and means responsive to an electrical condition of said exciting circuit for modifying the action of said contact to compensate the under-compounding tendency of said anti-hunting means.

5. The combination with a direct current generator having an armature and a field winding of a regulator for varying the current in said field winding comprising a winding responsive to an electrical condition of said armature, an anti-hunting winding energized in accordance with the voltage applied to said field winding, a vibratory contact actuated by said windings, and a winding energized in accordance with the current in said field winding for opposing the movement of said contact by said anti-hunting winding.

6. The combination with a direct current generator having an armature and an exciting circuit of a regulator for varying the current in said exciting circuit comprising a winding responsive to an electrical condition of said power circuit, an anti-hunting winding responsive to the voltage applied to said field winding, a vibratory contact actuated by said windings, means for modifying the action of said contact comprising a core, means for resiliently connecting said core to said contact, means for retarding the movement of said core, a winding connected in shunt to a portion of said exciting circuit for operating said core, and means for varying the time constant of the shunt circuit including the last named winding.

In witness whereof, I have hereunto set my hand this 10th day of September, 1918.

FRED H. WINTER.